Jan. 2, 1962 W. R. STRADER 3,015,118
SCOURING PAD HOLDER
Filed March 31, 1960
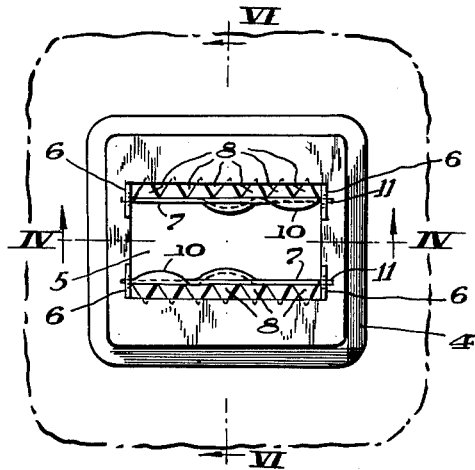
Fig. 1.
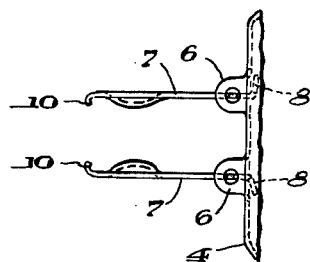
Fig. 2.
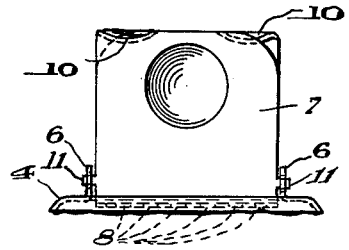
Fig. 3.
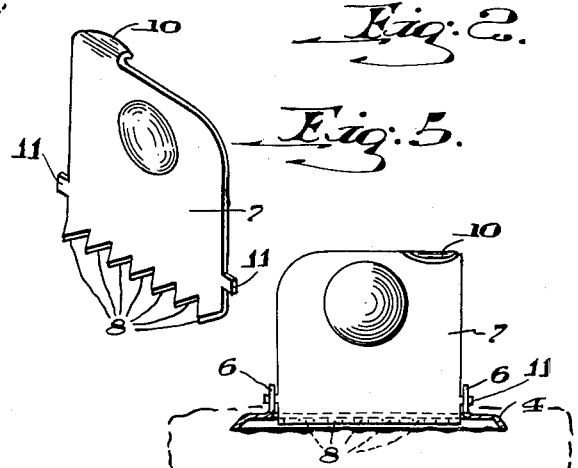
Fig. 5.
Fig. 4.
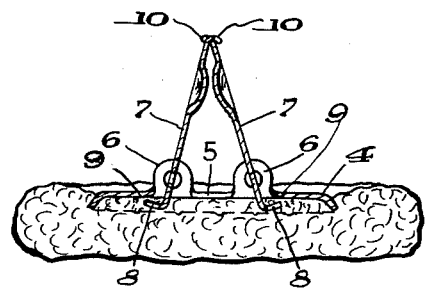
Fig. 6
INVENTOR.
WILLIAM R. STRADER.
BY Archworth Martin
his ATTORNEY.

United States Patent Office 3,015,118
Patented Jan. 2, 1962

3,015,118
SCOURING PAD HOLDER
William R. Strader, 6609 Kentucky Ave., Pittsburgh 6, Pa.
Filed Mar. 31, 1960, Ser. No. 19,050
5 Claims. (Cl. 15—209)

My invention relates to holders for use with scouring and polishing pads such as those of mineral wool, and felt.

One object of my invention is to provide a holder that can conveniently be applied to successively used pads and serve as a handle for manipulating the pad, thus not only facilitating the use of the pad but also avoiding contact of mineral wool, for example, with the fingers and also avoid soiling of the fingers.

One form which my invention may take is shown on the accompanying drawing, wherein:

FIGURE 1 is a plan view of the handle.

FIG. 2 is an end view thereof turned 90 degrees counterclockwise.

FIG. 3 is a face view of the structure of FIG. 2.

FIG. 4 is a view taken on the line IV—IV of FIG. 1.

FIG. 5 is a perspective view of one of the handle and gripping members of FIG. 2.

FIG. 6 is a vertical sectional view through the holder, in gripping engagement with a pad.

The holder comprises a base plate 4 having a central opening area 5. Ears 6 are struck up on the sides of the base plate to serve as bearings for handle members 7 which, at their inner edges, are laterally bent and have teeth 8 formed on these bent edges. These teeth when the handles are drawn together about their pivots 11, into perpendicular position will grip the pad against the plate at opposite sides 9 of the cutout area 5.

The upper ends of the handles 7 have laterally-turned lips 10, the lip 10 of each member snapping over the other handle member when the handles are brought together as in FIG. 6, thus retaining the holder in place. The edges of the plate are serrated somewhat, to resist sliding of the pad thereon during scouring and polishing, and they sink into the pad somewhat, so that the teeth 8 can more readily bite into the pad.

I claim as my invention:

1. A scouring pad holder that comprises a base member, having an opening through its mid-area, handle members pivoted at opposite edges of said opening in relatively opposed relation, the inner ends of the handle members extending inwardly to the plane of said opening and the outer ends of the handle members serving as manipulating and holding elements when perpendicular to the base, and teeth formed on the inner end of each of the handle members and extending at right angles thereto in a generally horizontal direction, when the handle is vertical, whereby when the base member is held on a pad and the outer ends of the handle members raised toward each other about their pivots, the said teeth will penetrate the pad.

2. A holder as recited in claim 1, wherein the teeth are in parallel rows when the handle members are lying on the base member and the rows of teeth on the respective handle members move away from one another during swinging of the handles to their upright positions.

3. A holder as recited in claim 1, wherein a clip member releasably holds the outer ends of the handle members together when raised.

4. A holder as recited in claim 2, wherein each row of teeth is in position to grip engaged areas of the pad against the adjacent edge of said opening.

5. A scouring pad holder that comprises a base member, having an opening through its mid-area, handle members pivoted at opposite edges of said opening in relatively opposed relation, and foldable upon the base, the inner ends of the handle members extending inwardly to the plane of said opening and the outer ends of the handle members serving as manipulating and holding elements, laterally-extending flanges on the inner end of each of the handle members, and extending at generally right angles thereto in a generally horizontal direction, when the handle is vertical, and teeth formed on the edges of the flanges which will extend away from each other when the handles are raised, whereby when the base member is held on a pad and the handle members moved upwardly about their pivots, the said teeth will penetrate the pad.

References Cited in the file of this patent
UNITED STATES PATENTS

| | | |
|---|---|---|
| 2,095,138 | Keller | Oct. 5, 1937 |
| 2,197,206 | Curtis et al. | Apr. 16, 1940 |
| 2,786,223 | Ziskind | Mar. 26, 1957 |